(No Model.)
C. C. WARREN.
CULTIVATOR.
No. 438,040. Patented Oct. 7, 1890.
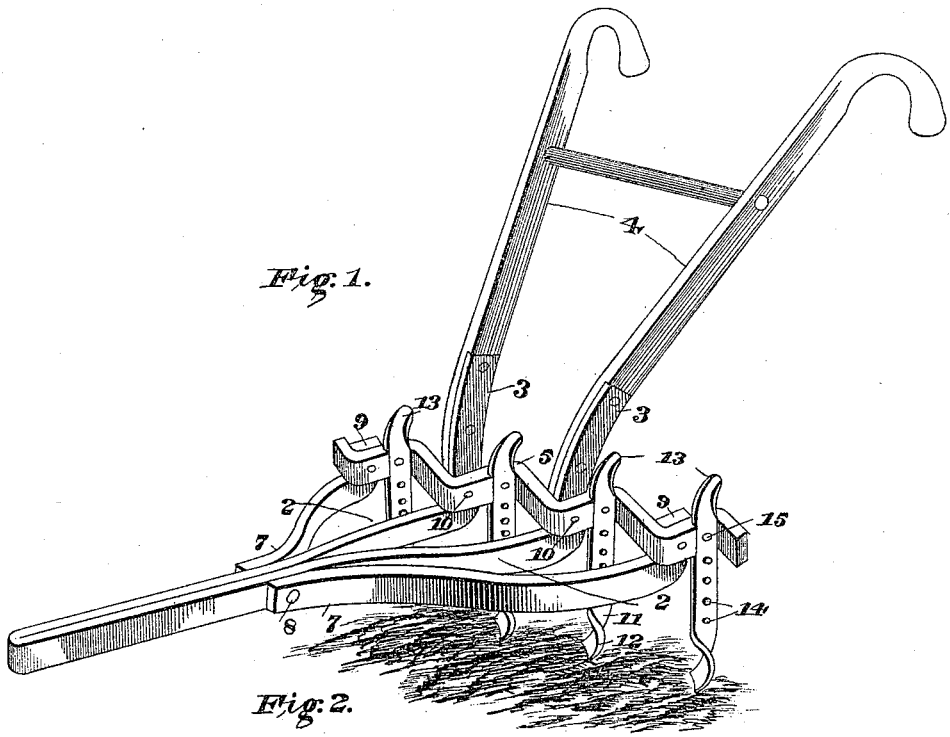
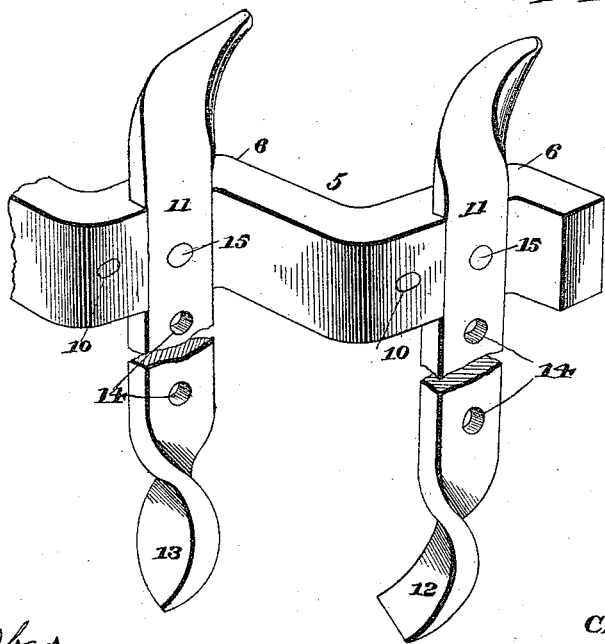
Witnesses:
B. S. Ober
W. S. Duvall
Inventor
Christopher C. Warren
By his Attorneys,
C. A. Snow & Co.

UNITED STATES PATENT OFFICE.

CHRISTOPHER COLUMBUS WARREN, OF ELLISVILLE DEPOT, MISSISSIPPI, ASSIGNOR OF ONE-HALF TO JOHN F. WEDGEWORTH, OF SAME PLACE.

CULTIVATOR.

SPECIFICATION forming part of Letters Patent No. 438,040, dated October 7, 1890.

Application filed July 3, 1890. Serial No. 367,654. (No model.)

*To all whom it may concern:*

Be it known that I, CHRISTOPHER COLUMBUS WARREN, a citizen of the United States, residing at Ellisville Depot, in the county of Jones and State of Mississippi, have invented a new and useful Cultivator, of which the following is a specification.

This invention has relation to cultivators, the objects in view being to provide an exceedingly simple, cheaply-constructed, and efficient cultivator, the teeth of which are adjustable vertically and reversible for the purpose of converting the same from a cultivator to a harrow adapted to pulverize the soil, and withal to combine strength and lightness.

Other objects and advantages of the invention will hereinafter appear in the following description, and be particularly pointed out in the claims.

Referring to the drawings, Figure 1 is a perspective of a cultivator constructed in accordance with my invention. Fig. 2 is a detail of a portion of a cultivator-standard, illustrating the different positions which the teeth may occupy.

Like numerals of reference indicate like parts in both figures of the invention.

In practicing my invention I construct the several beams, teeth, and standard of light steel or iron of oblong shape in cross-section, arranging their flat faces toward each other, whereby I gain a maximum strength with a minimum degree of weight.

1 designates the main beam, which, as shown, is formed of a bar of steel or iron, bent near its center to form terminals or branches 2. By reason of the point of bending one branch or terminal is slightly longer than the companion branch or terminal, and each has its rear end upwardly disposed or bent at a right angle to its remaining portion, as shown at 3, and are spaced apart or diverged. To the upper extremities of these terminals are bolted the cultivator-handles 4, which are of the usual construction and are upwardly and rearwardly disposed to the rear of the cultivator within convenient grasp of the hand of the operator following thereafter.

5 designates the cultivator-standard, also formed of bar iron or steel and bent to form a series of steps or offsets 6, in this instance four in number. These steps are formed by bending the standard at regular intervals at right angles in alternate reverse directions.

7 designates the long and short side beams, which at their front ends are bolted, as at 8, to the bifurcations or branches of the main beam, and the rear ends of said side beams are upturned, as at 9, and each takes in rear of and is bolted to an outer offset, as at 10. The two central offsets are bolted, as at 10, to the lower portions of the upwardly-turned ends 3 of the central beam, immediately below the handles 4.

11 designates the cultivator-teeth, which are formed of bar iron or steel, and are given at their ends half-twists, forming pulverizing or harrow teeth 12 at one end and cultivator-teeth 13 at their opposite ends. Between the twists the teeth are perforated, as at 14, at intervals to form adjusting-holes, and a tooth is provided for each offset, being bolted snugly in the angle thereof by means of a bolt 15. In this manner the teeth can be raised and lowered as desired and made to penetrate more or less into the soil.

By reversing the teeth, as shown in Fig. 2, the cultivator is converted into a harrow adapted to perform the ordinary functions of such.

Having described my invention, what I claim is—

1. In a cultivator, the combination, with a standard bent in a zigzag manner to form offsets, and a series of beams connected at their front ends and diverged and connected at their rear ends each to a separate offset, of a series of cultivator-teeth twisted at their opposite ends to form cultivator and harrow teeth and adjustably and reversibly mounted in the offsets, substantially as specified.

2. In a cultivator, the combination, with a doubled or bifurcated central beam and opposite long and short side beams, each of said beams having its rear ends upturned, of a transversely-disposed horizontal standard bent in a zigzag manner to form a series of offsets bolted to the upturned portions of the beams, and a series of cultivator-teeth terminating at opposite ends in harrow and cultivator teeth and provided with a series of adjusting-openings, and bolts for adjustably mounting a tooth in each of said offsets, substantially as specified.

In testimony that I claim the foregoing as my own I have hereto affixed my signature in presence of two witnesses.

CHRISTOPHER COLUMBUS WARREN.

Witnesses:
P. J. HARDY,
E. B. SHARP.